United States Patent
Lee et al.

(10) Patent No.: US 10,184,855 B2
(45) Date of Patent: Jan. 22, 2019

(54) PRESSURE SENSING DEVICE HAVING TEMPERATURE SENSOR

(71) Applicants: Hyundai Motor Company, Seoul (KR); Kia Motors Corporation, Seoul (KR); Comet Network Co., Ltd., Busan (KR)

(72) Inventors: Min Kyu Lee, Incheon (KR); Gi Young Nam, Suwon-si (KR); Dong Kyun Seo, Hwaseong-si (KR); Hwan Park, Seoul (KR); Sun Woo Choi, Seoul (KR); Sang Joo Kim, Seongnam-si (KR); Jung Min Kim, Seongnam-si (KR)

(73) Assignees: Hyundai Motor Company, Seoul (KR); Kia Motors Corporation, Seoul (KR); Comet Network Co., Ltd., Busan (KR)

(*) Notice: Subject to any disclaimer, the term of this patent is extended or adjusted under 35 U.S.C. 154(b) by 175 days.

(21) Appl. No.: 15/367,044

(22) Filed: Dec. 1, 2016

(65) Prior Publication Data

US 2017/0343442 A1    Nov. 30, 2017

(30) Foreign Application Priority Data

May 31, 2016  (KR) .................. 10-2016-0067639

(51) Int. Cl.
*G01L 9/00* (2006.01)
*G01L 9/08* (2006.01)
*G01L 19/00* (2006.01)
*G01L 19/06* (2006.01)
*G01L 19/14* (2006.01)
(Continued)

(52) U.S. Cl.
CPC ............ *G01L 19/0092* (2013.01); *F01P 7/16* (2013.01); *F02D 41/0002* (2013.01);
(Continued)

(58) Field of Classification Search
CPC . G01L 9/00; G01L 9/0051; G01L 9/08; G01L 19/00; G01L 19/04; G01L 19/06;
(Continued)

(56) References Cited

U.S. PATENT DOCUMENTS 5,948,989 A * 9/1999 Ichikawa ............ G01L 19/0084
                                                                73/708
6,003,379 A * 12/1999 Ichikawa ............ G01L 19/0092
                                                                73/708
(Continued)

FOREIGN PATENT DOCUMENTS

CN         201149497 Y       11/2008
CN         202362110 U        8/2012
(Continued)

*Primary Examiner* — Nguyen Q. Ha
(74) *Attorney, Agent, or Firm* — Morgan, Lewis & Bockius LLP

(57) ABSTRACT

Disclosed is a pressure detecting device having a temperature sensor, the device including: a housing having a first chamber, a second chamber, and a port part having a fluid guide tube that guides a pressure transmitting fluid to the second chamber; a lead frame coupled to the housing and configured for being connected to an external device; a circuit substrate electrically connected to the lead frame and including a first surface and a second surface; a pressure detecting element provided on the second surface of the circuit substrate and generating an electrical signal according to a pressure change; a tube coupled to the port part, whereby a first end of the tube is open and provided inside the first chamber; and a temperature detecting element provided inside the tube and transmitting an electrical signal generated according to a temperature change to the circuit substrate.

12 Claims, 4 Drawing Sheets

(51) Int. Cl.
*F01P 7/16* (2006.01)
*F02D 41/00* (2006.01)
*F02M 35/10* (2006.01)

(52) U.S. Cl.
CPC ....... *F02M 35/1038* (2013.01); *G01L 9/0051* (2013.01); *G01L 19/06* (2013.01); *F01P 2025/06* (2013.01); *F01P 2025/08* (2013.01); *F02D 2200/0406* (2013.01); *F02D 2200/0414* (2013.01); *F02D 2400/18* (2013.01); *G01L 2009/0066* (2013.01)

(58) Field of Classification Search
CPC ............. G01L 19/14; G01L 2009/0066; G01L 19/0092; F02D 41/0002; F02D 2200/0406; F02D 2200/0414; F02D 2400/18; F01P 7/16; F01P 2025/06; F01P 2025/08
See application file for complete search history.

(56) References Cited

U.S. PATENT DOCUMENTS

| | | | |
|---|---|---|---|
| 7,690,262 B2 * | 4/2010 | Nakabayashi | G01K 1/18 73/708 |
| 2005/0210990 A1 * | 9/2005 | Hayashi | G01K 7/22 73/708 |
| 2005/0229708 A1 * | 10/2005 | Nomura | G01L 19/0092 73/708 |
| 2007/0121701 A1 * | 5/2007 | Gennissen | G01K 13/02 374/143 |
| 2007/0186659 A1 * | 8/2007 | Engelhardt | G01D 11/245 73/708 |
| 2009/0007883 A1 * | 1/2009 | Kazuhiro | F02D 9/105 123/378 |
| 2011/0138921 A1 * | 6/2011 | Colombo | G01L 19/0038 73/706 |
| 2014/0341255 A1 * | 11/2014 | Kaiser | G01K 13/02 374/143 |

FOREIGN PATENT DOCUMENTS

| | | |
|---|---|---|
| JP | 10-185704 A | 7/1998 |
| JP | 11-72402 A | 3/1999 |
| JP | 3319990 B2 | 9/2002 |
| JP | 2004-198394 A | 7/2004 |
| JP | 2008-88937 A | 4/2008 |
| KR | 10-0534560 B1 | 12/2005 |
| KR | 10-0545312 B1 | 1/2006 |
| WO | WO-2013143748 A1 * 10/2013 ......... G01L 19/0092 |

* cited by examiner

PRESSURE SENSING DEVICE HAVING TEMPERATURE SENSOR

CROSS REFERENCE TO RELATED APPLICATION

The present application claims priority to Korean Patent Application No. 10-2016-0067639, filed May 31, 2016, the entire contents of which is incorporated herein for all purposes by this reference.

BACKGROUND OF THE INVENTION

Field of the Invention

The present invention relates generally to a pressure sensing device. More particularly, the present invention relates to a pressure sensing device having a temperature sensor in which pressure and temperature of a fluid to be measured are sensed at the same time.

Description of Related Art

A pressure sensing device having a temperature sensor refers to a pressure sensing device that integrates a temperature sensor. The pressure sensing device having a temperature sensor senses pressure and temperature of a vehicle coolant, or is provided in an intake manifold of an engine and senses pressure and temperature of an inlet air. The sensed pressure and temperature are transmitted to a controller.

A pressure sensor device having a temperature sensor includes a pressure sensor; a temperature sensor; a sensor casing receiving the pressure sensor and a connector pin electrically connecting the pressure sensor to an external circuit; and an entrance port part installed at the sensor casing and including a pressure inlet hole for introducing an object to be measured to the pressure sensor. The temperature sensor includes a temperature sensing element and a pair of lead wires, and is arranged in the pressure inlet hole. The lead wires of the temperature sensor are welded on the connector pin and are supported by the connector pin. One of the lead wires is a U-shaped wire, the U-shaped wire is inserted to the pressure inlet hole by applying pressure to the temperature sensing element toward an inner wall of the pressure inlet hole, and an reaction generated from the lead wire pressurizes the lead wire and the temperature sensing element to an external direction such that the lead wire and the temperature sensing element are pressurized to the inner wall of the pressure inlet hole. As a result, vibration of the temperature sensor can be suppressed while the temperature sensor is strongly fixed to the sensor device that has a compact size.

A pressure sensing apparatus having a temperature sensor, may include: a pressure sensor; a temperature sensor; a sensor casing being provided to receive the pressure sensor and a connector pin connecting the pressure sensor and an external circuit; and a port unit installed on the sensor casing and including a pressure intake port for guiding an object to be measured to the pressure sensor. The temperature sensor is arranged in the pressure intake port and electrically connected to the connector pin through the lead wire. The lead wire that includes the temperature sensor is supported by a connecting part provide between the connector pin and the lead wire. The lead wire includes a buffer provided in a part of the port unit to suppress vibration generated from the temperature sensor and the lead wire.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pressure detecting device having a temperature sensor, which has a robust and novel configuration.

In an aspect of the present invention, there is provided a pressure detecting device having a temperature sensor, the pressure detecting device including: a housing having a first chamber, a second chamber, and a port part having a fluid guide tube that guides a pressure transmitting fluid to the second chamber; a lead frame coupled to the housing and configured for being connected to an external device; a circuit substrate electrically connected to the lead frame and including a first surface facing the first chamber and a second surface facing the second chamber; a pressure detecting element provided on the second surface of the circuit substrate and generating an electrical signal according to a pressure change; a tube coupled to the port part, whereby a first end of the tube is open and provided inside the first chamber; and a temperature detecting element provided inside the tube and transmitting an electrical signal generated according to a temperature change to the circuit substrate.

The pressure detecting device having a temperature sensor described above may further include a fixing element including at least one ring-shaped part wrapping the tube. In addition, the fixing element may further include a tubular part that wraps an outer circumferential surface of the tube, and the ring-shaped part extends from an outer circumferential surface of the tubular part. Further, a circumference of the ring-shaped part may have a toothed shape. Also, the ring-shaped part may include a plurality of ring-shaped parts that are arranged to be spaced apart from each other by a predetermined distance along a lengthwise direction of the tube. In addition, the tube may include a stainless steel, and the fixing element may include a brass.

Also, the pressure detecting device having a temperature sensor described above may further include: a first conductive wire electrically connecting the temperature detecting element and the circuit substrate to each other; and a second conductive wire electrically connecting the circuit subtract and the lead frame to each other.

In addition, the pressure detecting device having a temperature sensor may further include: a first gel that covers the first surface of the circuit substrate, the first conductive wire, and the second conductive wire; and a second gel that fills the second chamber such that the second gel covers at least the pressure detecting element. The lead frame may be coupled to the housing through insert-molding.

Therefore, the pressure detecting device having the temperature sensor of the present invention is configured for detecting pressure and temperature of an object to be measured at a same time and has a novel configuration.

In addition, the tube and the housing of the embodiments including the fixing element are strongly coupled to each other. Further, the pressure detecting device of the present invention can prevent an inflow of an object to be measured including coolant into the housing through a gap between the tube and the housing.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
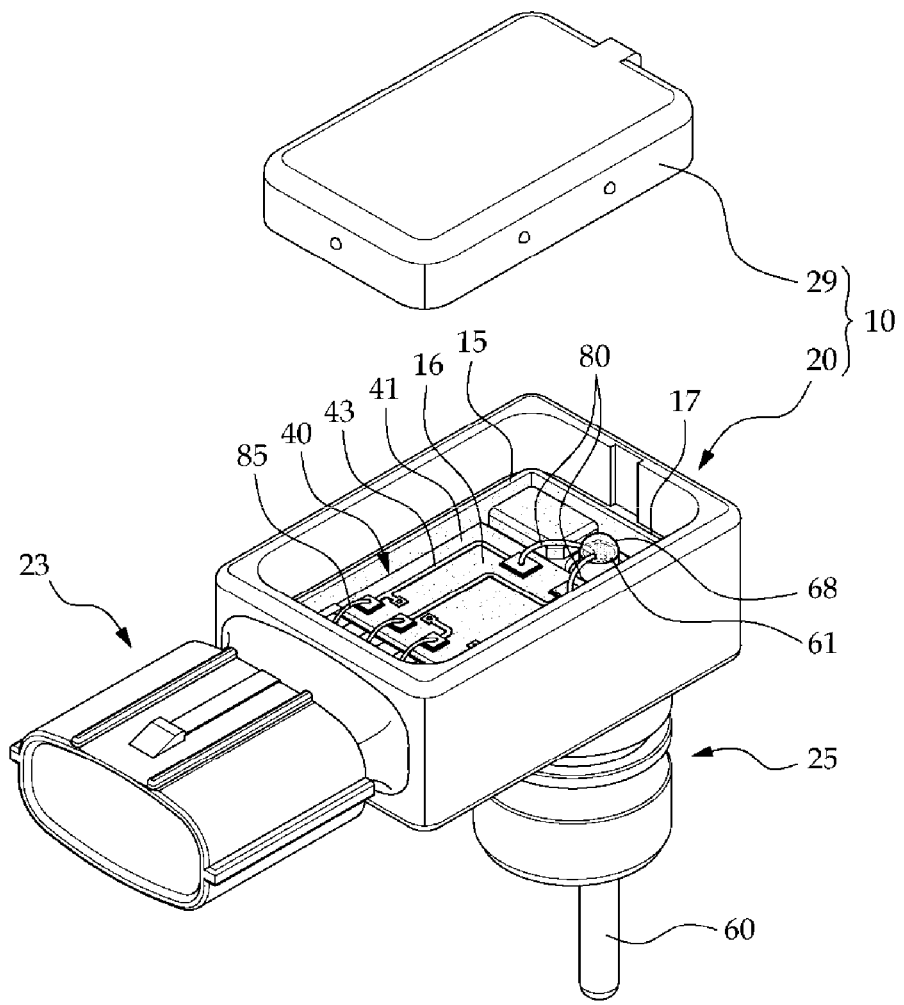
FIG. 1 is an exploded perspective view of a pressure detecting device having a temperature sensor according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
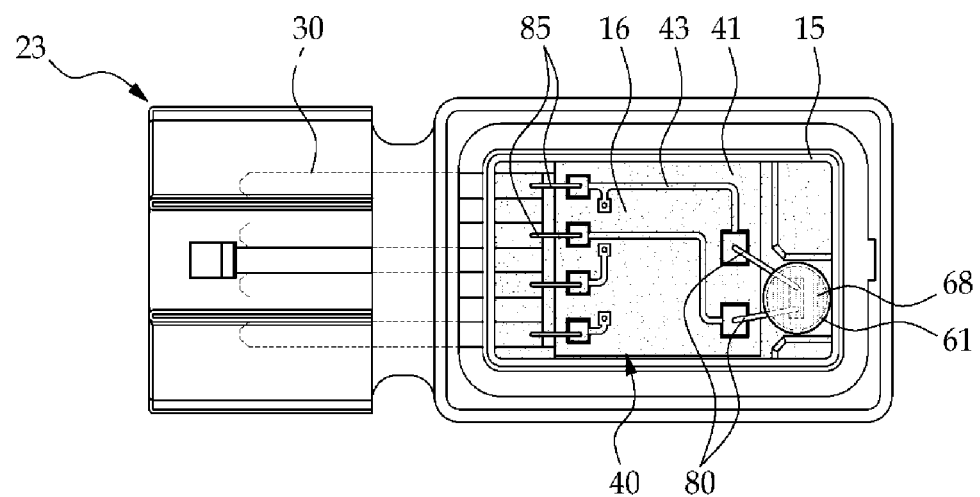
FIG. 2 is a top plan view of the pressure detecting device having the temperature sensor of FIG. 1 from which a cover is removed.
Figure 3A:
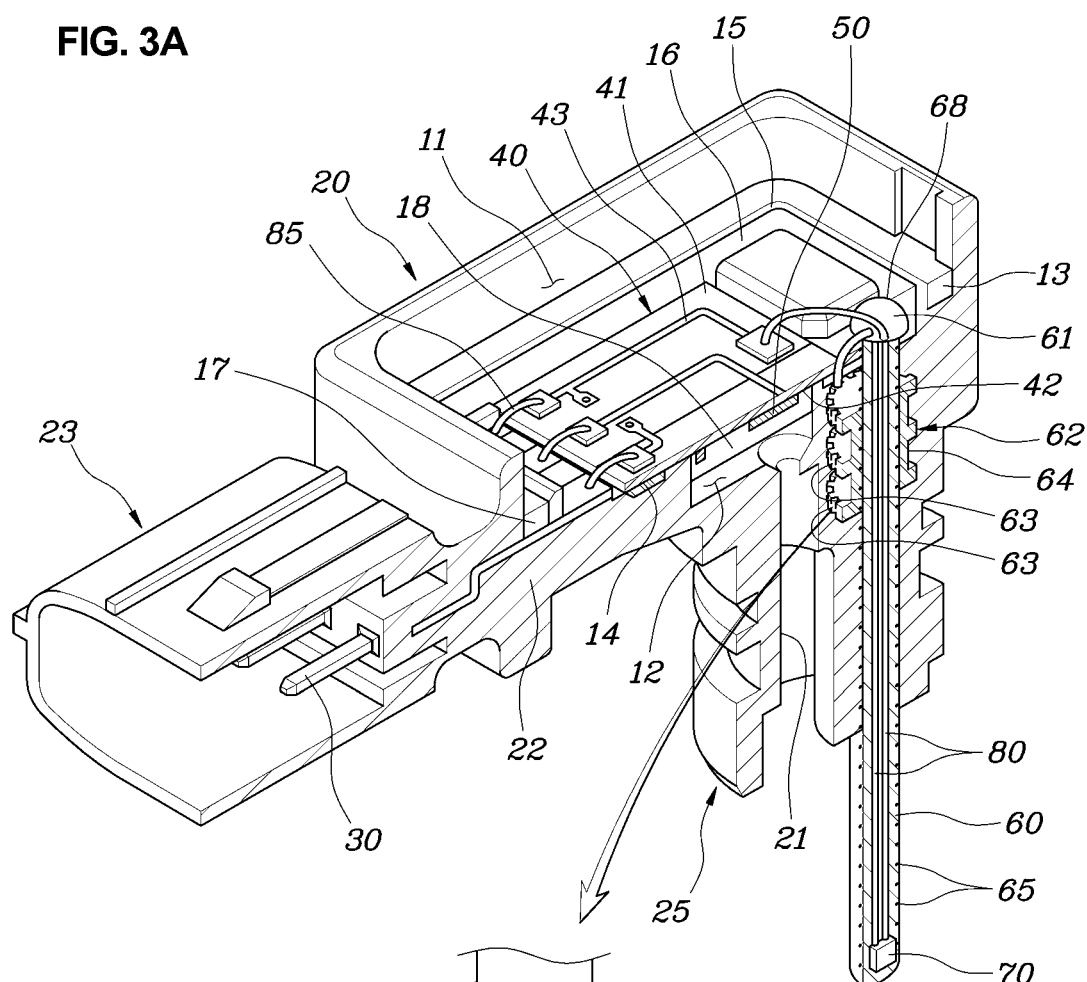
FIG. 3A is a sectional perspective view of the pressure detecting device having the temperature sensor of FIG. 1 from which the cover is removed and FIG. 3B is a view illustrating a circumference of a ring-shaped part having a toothed shape.
Figure 3B:
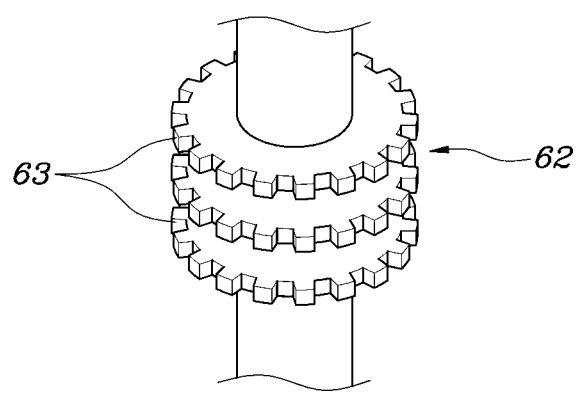
Figure 4:
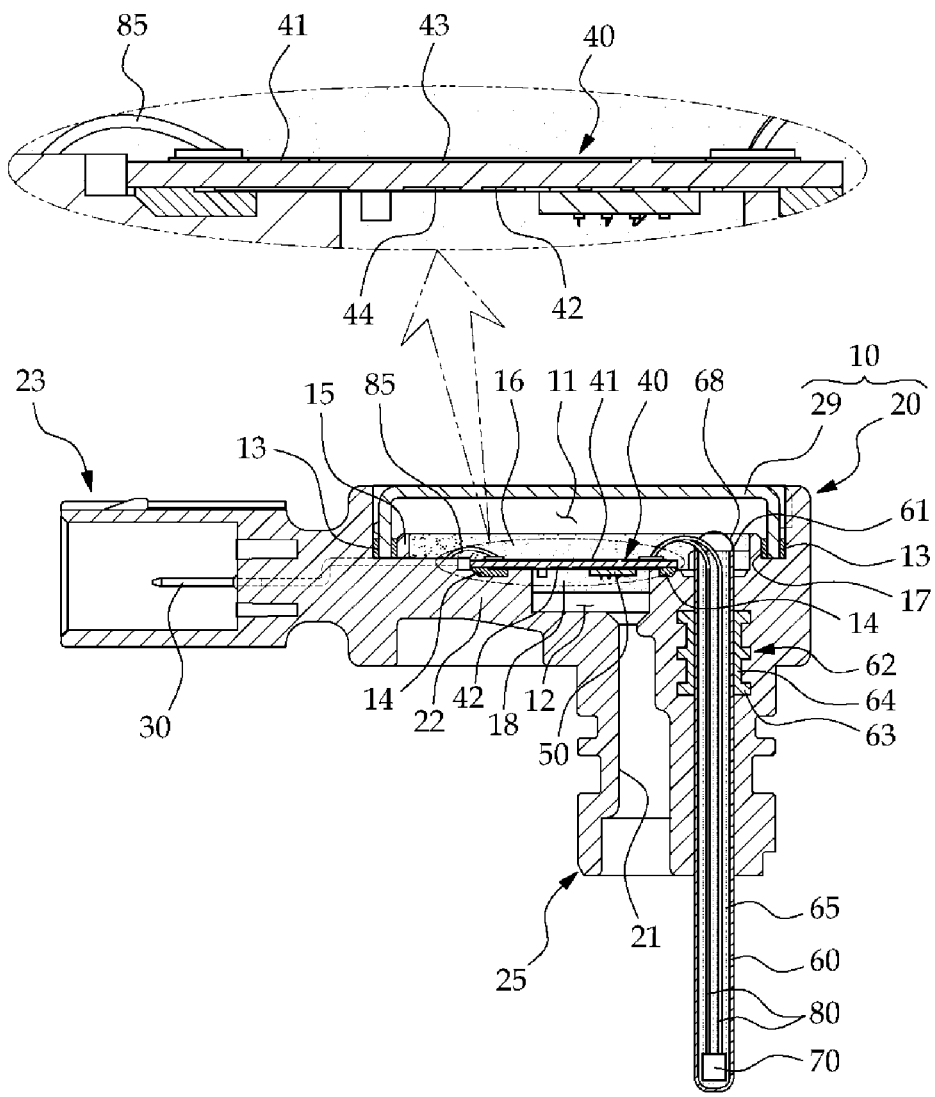
FIG. 4 is a sectional view of the pressure detecting device having the temperature sensor of FIG. 1.

FIG. 1 is an exploded perspective view of a pressure detecting device having a temperature sensor according to an embodiment of the present invention. FIG. 2 is a top plan view of the pressure detecting device having the temperature sensor of FIG. 1 from which a cover is removed. FIG. 3A is a sectional perspective view of the pressure detecting device having the temperature sensor of FIG. 1 from which the cover is removed. FIG. 3B is a view illustrating a circumference of a ring-shaped part having a toothed shape. FIG. 4 is a sectional view of the pressure detecting device having the temperature sensor of FIG. 1. The pressure detecting device having the temperature sensor according to the embodiment of the present invention senses pressure and temperature of a vehicle coolant.

Referring to FIGS. 1 to 4, the pressure detecting device having the temperature sensor according to the embodiment of the present invention includes a housing 10, a lead frame 30, a circuit substrate 40, a pressure detecting element 50, a tube 60, a temperature detecting element 70, a first conductive wire 80, and a second conductive wire 85.

The housing 10 includes a body 20 and a cover 29. The cover 29 is inserted into the body 20 and seals an open upper end of the body 20 from an outside. The housing 10 is made of a resin. The housing 10 has a first chamber 11 and a second chamber 12. The second chamber 12 is separated from the first chamber 11 by the circuit substrate 40. The cover 29 separates the first chamber 11 from an outside by covering the first chamber 11. A first sealing part 13 is provided in an area in which the cover 29 and the body 20 are coupled. The junction between the cover 29 and the body 20 is sealed by the first sealing part 13 such that the first chamber 11 is sealed from an outside. The first sealing part 13 may be made of an adhesive bond. The first sealing part 13 is applied in a connecting groove 17 formed along an inside surface of a sidewall the body 20. The first sealing part 13 may have a quadrangular shape.

A port part 25 having a cylindrical shape is provided in a lower part of the body 20. The port part 25 includes a long fluid guide tube 21 that guides a pressure transmitting fluid including exhaust gas or coolant to the second chamber 12. The fluid guide tube 21 is eccentrically provided in the port part 25.

A connector part 23 is provided in a first side of the body 20. The lead frame 30 that is electrically connected to an external device including electronic control unit (ECU) is coupled to the connector part 23. It is preferable to couple the lead frame 30 to the body 20 of the housing 10 through insert-molding. A first end of the lead frame 30 is extended to inside the housing 10 and a second end of the lead frame 30 is extended to outside the housing 10.

The circuit substrate 40 includes a first surface 41 and a second surface 42 that are parallel to each other. The circuit substrate 40 is provided inside the body 20 such that the circuit substrate 40 covers the second chamber 12. A second sealing part 14 is provided between the second surface 42 of the circuit substrate 40 and a supporting part 22 that encircles the second chamber 12. A junction between the supporting part 22 and the second surface 42 of the circuit substrate 40 is sealed by the second sealing part 14, thus the second chamber 12 is sealed from the first chamber 11 by the second sealing part 14. The second sealing part 14 may be an adhesive.

It is preferable to use a ceramic circuit substrate as the circuit substrate 40 since high temperature exhaust gas may flow into the second chamber 12.

The first surface 41 and the second surface 42 of the circuit substrate 40 have a first conductive pattern 43 and a second conductive pattern 44, respectively. The first conductive pattern 43 and the second conductive pattern 44 are electrically connected to each other by a conductive via hole. The first conductive pattern 43 is electrically connected to the lead frame 30. According to the embodiment, the first conductive pattern 43 is electrically connected to the lead frame 30 by the second conductive wire 85. The second conductive wire 85 may be an aluminum wire. Of course, the first conductive pattern 43 may be electrically connected to the lead frame 30 by using other methods including welding, etc.

In addition, the circuit substrate 40 includes the pressure detecting element 50 on the second surface 42 thereof. The pressure detecting element 50 may be a silicon-based semiconductor pressure sensor having a pressure sensitive diaphragm. In other words, the pressure detecting element 50 may include a diaphragm of single-crystal silicon and a plurality of resistors provided on a surface of the diaphragm.

When the diaphragm is deformed by pressure, the plurality of resistors provided on the surface of the diaphragm are also deformed, thus a resistor value is changed by the deformation. Accordingly, an electric signal change occurs when the resistor value is changed by the deformation. The pressure detecting element 50 is attached on the second surface 42 of the circuit substrate 40 by using an adhesive such that the diaphragm faces the fluid guide tube 21. Further, the pressure detecting element 50 is electrically connected to the second conductive pattern 44 by using methods including soldering, wire bonding, etc.

The pressure detecting element 50 is provided inside the second chamber 12 that is sealed by the second sealing part 14. The pressure detecting element 50 generates an electrical signal according to a pressure change in the second chamber 12. The generated electrical signal is transmitted to the lead frame 30 by sequentially passing the conductive via hole, the first conductive pattern 43, and the second conductive wire 85.

The tube 60 is eccentrically provided in the port part 25. The tube 60 may be made of a metal with high thermal conductivity. It is preferable to couple the tube 60 to the port part 25 through insert-molding. A fixing element 62 is provided on a middle part of the tube 60. The fixing element 62 is configured to prevent an inflow of an object to be measured including coolant through a fine gap between the tube 60 and port part 25. In addition, the fixing element 62 is configured to strongly fix the insert-molded tube 60 to the port part 25.

In the embodiment, the fixing element 62 includes three ring-shaped parts 63 and two tubular parts 64. The ring-shaped parts 63 and tubular parts 64 are integrated with each other into a single body. The tubular parts 64 have a hollow cylindrical shape, and the tube 60 is inserted into the hollow part of the tubular parts 64. The ring-shaped parts 63 are coupled to outer circumference surfaces of the tubular parts 64. Here, the ring-shaped parts 63 extend outward from the outer circumferential surfaces radial directions of the tubular parts 64 and have a circular plate shape. Circumferences of the ring-shaped parts 63 have a toothed shape such that the ring-shaped parts 63 are efficiently coupled to the port part 25. The ring-shaped parts 63 prevent an inflow of the object to be measured by blocking the gap between the tube 60 and the port part 25.

The tube 60 may be made of stainless-steel and, the fixing element 62 may be made of brass. The fixing element 62 may be fixed to the tube 60 through thermal press fitting.

A lower end of the tube 60 is sealed and an upper end of the tube 60 is open. The open upper end of the tube 60 is placed inside the first chamber 11 of the housing 10.

The temperature detecting element 70 is provided inside a lower part of the tube 60. The temperature detecting element 70 generates an electrical signal according to a temperature change in the tube 60. The tube 60 is filled with a gel or grease 65 having high thermal conductivity. Since the tube 60 is high thermal conductive and is filled with the grease 65 having high-thermal conductivity, the inside temperature of the tube 60 is almost equal to the temperature of the object fluid to be measured. For example, a negative temperature coefficient (NTC) element may be used for the temperature detecting element 70. In addition, the grease 65 may also be configured to prevent vibration-caused damage of the temperature detecting element 70 by wrapping the temperature detecting element 70.

The first conductive wire 80 connects the temperature detecting element 70 to the first conductive pattern 43 of the circuit substrate 40. A first end of the first conductive wire 80 is connected to the temperature detecting element 70 and a second end of the first conductive wire 80 is coupled to the first conductive pattern 43 via the open upper end of the tube 60. The electrical signal generated from the temperature detecting element 70 is transmitted to the lead frame 30 by sequentially passing the first conductive wire 80 and the first conductive pattern 43. The open upper end 61 of the tube 60 is sealed by a resin 68. The resin 68 prevents a leakage of the grease 65 filling the tube 60 and fixes the first conductive wire 80.

In addition, a barrier 15 having a quadrangular frame shape is provided inside the first chamber 11 such that the first surface 41 of the circuit substrate 40 and at least a part of the lead frame 30 are encircled by the barrier 15. A first gel 16 may fill inside the barrier 15 to protect the second conductive wire 85 that connects the circuit substrate 40 and the lead frame 30, and the first conductive wire 80. The first gel 16 may be made of a fluorine silicone gel.

A second gel 18 may fill the second chamber 12 to protect the pressure detecting element 50 and a connection part of the pressure detecting element 50 and the second conductive pattern 44. The second gel 18 is injected into the second chamber 12 through the fluid guide tube 21.

Although a preferred embodiment of the present invention has been described for illustrative purposes, those skilled in the art will appreciate that various modifications, additions and substitutions are possible, without departing from the scope and spirit of the invention as disclosed in the accompanying claims.

For example, although the fixing element 62 of the present invention includes the ring-shaped parts 63 and the tubular parts 64 in the above-mentioned embodiment, it should be understood that the fixing element 62 may include only the ring-shaped parts 63 without having the tubular parts 64. In this case, at least one ring-shaped part 63 may be fixed to the tube 60 by directly fitting the ring-shaped part 63 over the tube 60.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pressure detecting device having a temperature sensor, the pressure detecting device comprising:
   a housing having a first chamber, a second chamber, and a port part having a fluid guide tube that guides a pressure transmitting fluid to the second chamber;
   a lead frame coupled to the housing and configured for being connected to an external device;

a circuit substrate electrically connected to the lead frame and including a first surface facing the first chamber and a second surface facing the second chamber;

a pressure detecting element provided on the second surface of the circuit substrate and generating an electrical signal according to a pressure change;

a tube coupled to the port part, whereby a first end of the tube is open and provided inside the first chamber;

a temperature detecting element provided inside the tube and transmitting an electrical signal generated according to a temperature change to the circuit substrate; and a fixing element including at least one ring-shaped part wrapping the tube.

2. The pressure detecting device of claim 1, wherein the fixing element further includes a tubular part that wraps an outer circumferential surface of the tube, and the at least one ring-shaped part extends from an outer circumferential surface of the tubular part.

3. The pressure detecting device of claim 1, wherein a circumference of the at least one ring-shaped part has a toothed shape.

4. The pressure detecting device of claim 1, wherein the at least one ring-shaped part includes a plurality of ring-shaped parts that are arranged to be spaced apart from each other by a predetermined distance along a lengthwise direction of the tube.

5. The pressure detecting device of claim 1, wherein the tube is made of a stainless steel, and the fixing element is made of a brass.

6. The pressure detecting device of claim 1, wherein the tube is coupled to the port part through insert-molding.

7. The pressure detecting device of claim 1, further including: a resin sealing the open end of the tube.

8. The pressure detecting device of claim 1, further including: a grease or a gel that fills an inside of the tube.

9. The pressure detecting device of claim 1, further including:
    a first conductive wire electrically connecting the temperature detecting element and the circuit substrate to each other; and
    a second conductive wire electrically connecting the circuit substrate and the lead frame to each other.

10. The pressure detecting device of claim 9, further including: a first gel that covers the first surface of the circuit substrate, the first conductive wire, and the second conductive wire.

11. The pressure detecting device of claim 1, wherein the lead frame is coupled to the housing through insert-molding.

12. The pressure detecting device of claim 1, wherein the second surface of the circuit substrate covers the second chamber, and the pressure detecting device further includes a second gel that fills the second chamber such that the second gel covers at least the pressure detecting element.

* * * * *